United States Patent [19]
Ketcham

[11] Patent Number: 6,075,860
[45] Date of Patent: Jun. 13, 2000

[54] APPARATUS AND METHOD FOR AUTHENTICATION AND ENCRYPTION OF A REMOTE TERMINAL OVER A WIRELESS LINK

[75] Inventor: Carl Ketcham, Taylorsville, Utah

[73] Assignee: 3Com Corporation, Santa Clara, Calif.

[21] Appl. No.: 08/802,070

[22] Filed: Feb. 19, 1997

[51] Int. Cl.[7] .............................. H04L 9/00; H04L 9/08
[52] U.S. Cl. ............................... 380/25; 380/21; 380/49; 713/201
[58] Field of Search .................. 380/21, 25, 49; 395/187.01, 188.01

[56] References Cited

U.S. PATENT DOCUMENTS

| | | | |
|---|---|---|---|
| 4,295,039 | 10/1981 | Stuckert | 235/380 |
| 5,241,594 | 8/1993 | Kung | 380/4 |
| 5,345,506 | 9/1994 | Tsubakiyama et al. | 380/23 |
| 5,351,293 | 9/1994 | Michener et al. | 380/21 |
| 5,434,918 | 7/1995 | Kung et al. | 380/25 |
| 5,557,654 | 9/1996 | Mäenpää | 379/58 |
| 5,557,676 | 9/1996 | Nàslund et al. | 380/23 |
| 5,557,679 | 9/1996 | Julin et al. | 380/23 |
| 5,588,059 | 12/1996 | Chandos et al. | 380/21 |
| 5,602,918 | 2/1997 | Chen et al. | 380/21 |
| 5,740,361 | 4/1998 | Brown | 395/187.01 |
| 5,742,756 | 4/1998 | Dillaway et al. | 395/186 |

*Primary Examiner*—Pinchus M. Laufer
*Attorney, Agent, or Firm*—Workman, Nydegger & Seeley

[57] ABSTRACT

A method and system for authenticating an authorized user of a remote terminal attempting to interconnect with a computer network over a wireless modem is provided. An encrypted wireless communication channel is established between a remote terminal and a network server for facilitating the authentication process. An authorized user presents an authentication card containing credentials including a user identifier and an authentication encryption key to a remote terminal. The remote terminal establishes a wireless communication channel with a network server which provides a firewall between unauthenticated users and a computer network. The network server and the remote terminal then exchange encrypted information thus verifying the authenticity of each party. The remote terminal and the network server each independently generate a data encryption key for use in establishing a secure encrypted wireless communication channel therebetween.

7 Claims, 5 Drawing Sheets

APPARATUS AND METHOD FOR AUTHENTICATION AND ENCRYPTION OF A REMOTE TERMINAL OVER A WIRELESS LINK

BACKGROUND OF THE INVENTION

1. The Field of the Invention

The field of the invention relates to computer and communication networks having a remote terminal isolated from the remainder of the computer network. More specifically, the present invention relates to verification of the identity of a user of the remote terminal, and more particularly, the invention relates to authenticating the user of the remote terminal as an authorized user of the computer network.

2. Present State of the Art

Computer networks have traditionally relied upon physical boundaries such as structures and facilities to provide security for the computer network. In fact, traditional networks interconnect computers or local terminals into networks using hard-wired physical connections for promoting interoperability. As such, local networks originally did not discriminate among users of the local terminals. As security awareness increased, local terminals provided discrimination by incorporating simplistic password protection. Because of the localized nature of password protection on a particular local terminal, users were often hindered from utilizing various other terminals.

As computer networks became more sophisticated additional resources were configured within the computer network to provide additional functionality such as extended data storage and centralized log-in protection. For example, as network servers became more sophisticated, authorized users of a computer network were able to migrate throughout the computer network to other local terminals. As computer network terminals increased in size and complexity security concerns also increased. One previous solution for managing such security concerns included interconnecting local smaller computer networks with other computer networks by physically coupling together network servers of each computer network. The coupling of these computer networks was generally accomplished using physical links such as coaxial cable or fiber optic lines. As computer networks became more diverse and spatially separated, security concerns were again raised that information exchanged between these intercomputer network links may become vulnerable to tampering or interception as such intercomputer network links often occur over public telephone lines or other accessible communication channels. To combat these concerns, network servers incorporated encryption protection for the information exchanged between computer networks. Encryption of exchange data requires that each network server have a key or password for encrypting and decrypting exchanged information.

Furthermore, additional security concerns arise when local terminals within a computer network are no longer physically secured within a structural boundary. Such concerns arise when local terminals are remotely operated. Remote operation of a terminal raises an additional security concern regarding the authentication of the remote terminal. Some security concerns of remote operation of local terminals have been resolved by incorporating similar log-in password protection techniques for remote terminal operation as were required for local terminal operation. In such configurations, remote terminals are programmed with an identifier which may be verified by a network server as being a remote terminal authorized to operate within the computer network.

Additionally, prior configurations further protect informational exchanges between remote terminals and a network server by incorporating encryption into each informational exchange. Such bi-directional encryption required the preplacement of matching encryption keys within both the remote terminal and the network server. Compatible informational exchange between the remote terminal and network server verified the identity of the remote terminal. Although such correlation of a remote terminal with a network server provides a level of assurance of the legitimacy of the remote terminal, the association of the encryption key with a remote terminal does not provide assurances to the network server of the identity of the user of the remote terminal. Resolution of this concern was mitigated by employing simplistic log-in password procedures. However, identification procedures incorporating users specific information stored on the remote terminal do not facilitate a particular remote user moving between remote terminals.

Mobile remote terminals present yet another variable to a computer network attempting to identify or authenticate legitimate users when such remote terminals attempt to access the computer network using wireless communication means. Such unpredictable remote access removes any physical benefits fixed site remote terminals may have provided since wireless communication channels may be established from non-fixed locations. Furthermore, as remote terminals employing wireless communication channels become more prevalent, they are becoming more fungible as access centers to computer networks. The security focus must then shift from authenticating an authorized remote terminal to focusing on authenticating the user of the remote terminal. Thus, prior art configurations have focused on authentication of a remote terminal optionally coupled with simplistic password protection of the remote terminal against unauthorized users of the remote terminal rather than on authenticating the user themselves.

In conclusion, there exists a need for an apparatus and method for authenticating an authorized user prior to permitting access to a computer network. Furthermore, there exists a need for providing a method and system for establishing an encrypted authenticated wireless communication channel between an authorized user and a computer network. Though attempts have been made to correlate a remote terminal with authorized terminals of a computer network, there exists no scheme or configuration for solely authenticating an authorized user of a remote terminal and establishing an authenticated encrypted secure wireless communication channel therebetween.

SUMMARY AND OBJECTS OF THE INVENTION

It is, therefore, an object of the present invention to authenticate an authorized user of a remote terminal in a computer network prior to permitting access of that authorized user to the computer network.

It is another object of the present invention to establish a secure authenticated wireless communication channel between an authorized user of a remote terminal and a computer network.

It is yet another object of the present invention to provide a system for authenticating an authorized user of a computer network prior to permitting access of the authorized user to the computer network.

It is another object of the present invention to provide a system for establishing an encrypted authenticated wireless communication channel between a remote terminal and a computer network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus and method for authenticating an authorized user of a computer network which permits remote access by authorized users over a wireless communication channel is presented. Additionally, an apparatus and method for establishing a secure authenticated wireless communication channel is presented.

The present invention identifies an authorized user of the computer network and using encryption algorithmic techniques generates an authentication encryption key unique to that authorized user. The generation of the authentication encryption key and its association with a mobile subscriber identifier designating the authorized user are generated and associated by an account generator within the system. The account generator, for example, may be a software application executing in conjunction with a computer or resident within a network server. The mobile subscriber identifier designating the authorized user coupled with the authenticating encryption key unique to that user are then securely distributed to both a network server coupled to a computer network and an authentication card to be securely carried by the authorized user.

The network server operates as a barrier or a firewall between the communication network and remote users attempting to access the computer network. As users attempt to access the computer network, the network server authenticates the user to determine if they are in fact a known authorized user. Authentication occurs over an unencrypted wireless communication channel wherein information is generated, manipulated, and mutually exchanged between the network server and the remote terminal. Each side independently verifies the other as being an authentic prior to continuing additional informational exchange. Furthermore, in the preferred embodiment, the remote terminal and the network server generate identical encryption keys for use in securing subsequent informational exchanges.

One exemplary embodiment of the present invention employs the remote terminal (e.g., a portable computer) operably coupled to a wireless modem for facilitating the establishment of a wireless communication channel. The remote terminal then initiates a communication request to the wireless modem to establish a communication channel with the network server. Once the communication channel is established, the network server prevents any access to other portions of the computer network prior to the successful completion of the authentication process.

To facilitate the authentication process both the authorized user and the network server must possess compatible mobile subscriber identifiers and authentication encryption keys. The network server maintains these values in a resident database. The remote terminal, however, does not retain the mobile subscriber identifier nor the authentication encryption key. Instead, an authentication card personal to the authorized user is maintained by that authorized user. The authorized user when desiring to establish an encrypted authenticated wireless communication channel with the network server inserts or places the authentication card in a card reader which is operably coupled to the remote terminal. The remote terminal then queries the authentication card via the card reader to extract the mobile subscriber identifier and its corresponding authentication encryption key. The remote terminal then dispatches the mobile subscriber identifier to the network server for use as an index in retrieving the corresponding authentication encryption key. The network server and remote terminal then commence in authenticating the authorized user by exchanging, encrypting or signing information and then verifying the exchanged information to establish the authenticity of the user. In the preferred embodiment, when the users authenticity is established both the network server and the remote terminal independently generate a data encryption key for encrypting subsequent informational exchanges.

In the exemplary embodiment of the present invention, the network server initiates the mutual exchange of encrypted values by generating a random number. Upon receipt of this random number, the remote terminal employs encryption algorithms in conjunction with the authentication encryption key previously retrieved from the authentication card to sign or encrypt the random number. This signature of the remote terminal on the random number is then dispatched to the network server for verification. Upon successful verification of the signed random number, the network server demonstrates its authenticity by encrypting or signing and returning to the remote terminal the random number as previously signed by the remote terminal. The remote terminal upon successful verification of the network servers authenticity generates a data encryption key for subsequent informational exchanges with the network server. The network server, likewise, generates a data encryption key for corresponding communications with the remote terminal.

These and other objects and features of the present invention will be more fully apparent from the following description and appended claims, or may be learned by the practice of the invention as set forth herein.

BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As used herein, the term "remote terminal" refers to any known interfacing device such as a personal computer, notebook computer, or other mobile computer-type interfaces. Such "remote terminals" may be autonomous devices such as personal computers capable of independent functionality, or they may be simplified devices possessing minimal computation capabilities and thus primarily configured to receive and display information. This use of the term "remote terminal" is shown by way of example and not by limitation and those skilled in the art will undoubtedly understand and appreciate various different computational devices that are equally within the contemplation of the use of the term.

As used herein, the term "network server" refers to a peripheral system coupled within a computer network for providing and accommodating access to the network from diverse locations. Such an access point forms a barrier or a firewall to the remaining computer network. This use of the term "network server" is employed by way of example and those skilled in the art may also know of other interfacing mechanisms that are also contemplated within the scope of the present invention.

Figure 1:
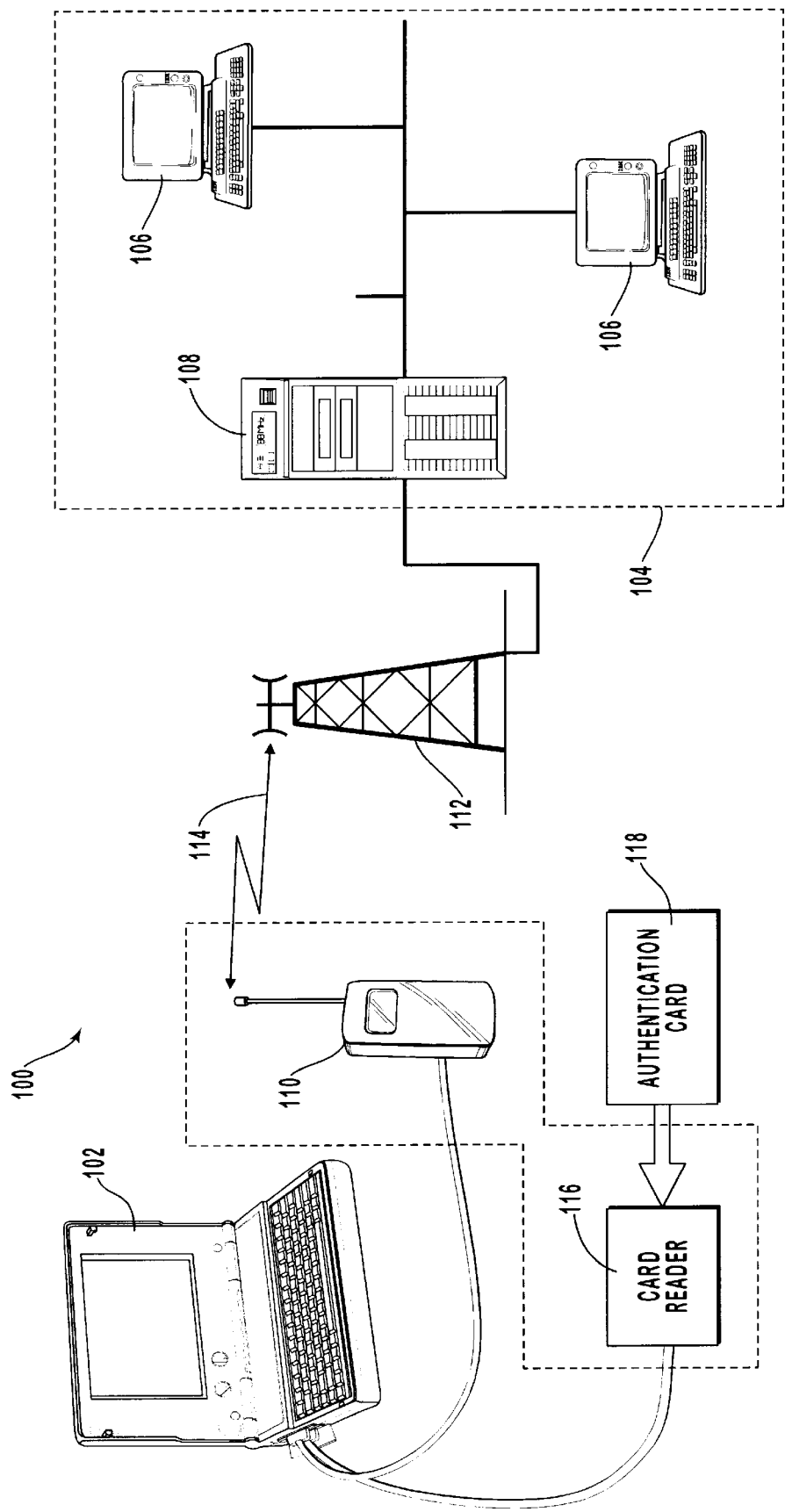
FIG. 1 is a block diagram of a system configured with a remote terminal capable of authenticating an authorized user of a computer network, in accordance with a preferred embodiment of the present invention.

FIG. 1 is a functional block diagram of a system 100 for authenticating an authorized user of a remote terminal prior to permitting access of the authorized user to the computer network. A computer network 104 is comprised of a plurality of local terminals 106 physically and operably coupled for beneficial processing. The coupling of local terminals 106 may be accomplished by traditional methods employed by local area networks or other networking techniques known by those of skill in the art. A network server 108 operably couples with computer network 104 for providing an access point to computer network 104. Network server 108 optionally may comprise additional support functionality for local terminals 106 such as remote disk servers for file storage.

Network server 108 additionally performs the function of providing a "firewall" for computer network 104. Network firewalls make it more difficult for computer networks to be infiltrated thus reducing or stopping malicious damage or intrusion. Network server 108 essentially places a barrier between computer network 104 and the outside world. Network server 108 accommodates access by outside users to the verification and authentication processes of network server 108 prior to affording users outside of computer network 104 access within. Computer network 104 may be configured as a local area network or other area networks known by those skilled in the art such as wide area networks or other configurations.

As discussed above, users of computer networks frequently require access to networks from remote locations. To facilitate remote operation, a remote terminal 102 provides an interface to an authorized user similar or equivalent to those interfaces provided by local terminals. Furthermore, remote terminals may be sufficiently remote or mobile that a hardwire interconnect with computer network 104 is prohibitive. Thus, to facilitate interaction with computer network 104, a wireless communication channel 114 is established. Wireless communication channel 114, in the preferred embodiment, utilizes a wireless infrastructure 112 for interfacing to network server 108. Such wireless infrastructures may take the form of conventional cellular technologies such as analog and digital cellular. Analog cellular, such as AMPS, accommodate the transmission of digital information using traditional modem technology. Digital cellular, on the other hand, provides more diverse standards and more efficiently accommodates digital transmissions. Digital cellular standards such as USDC, GSM, and PCS transmit information over wireless communication channel 114 in digital form. Furthermore, some cellular standards also support collateral channels dedicated to the transmission of digital data. One such example is cellular digital packet data (CDPD) which facilitates the transmission and reception of intermittent packet data. Standard voice cellular channels require the establishment of a dedicated communication channel that is maintained throughout the entire communication session. However, CDPD facilitates sporadic data transmission be a plurality of dispersed digital transceivers without requiring each transceiver to establish and sustain a dedicated communication channel. A wireless modem 110 operably couples with remote terminal 102 for providing and facilitating the generation of wireless communication 114. Wireless modem 110 in the preferred embodiment, is capable of transmission and reception of CDPD information.

Card reader 116 operably couples with remote terminal 102 for providing an interface for receiving mobile subscriber identifiers and authentication keys from an authentication card 118. Card reader 116 may be physically integrated into remote terminal 102 or may be coupled to or integrated with wireless modem 110. Card reader 116 operably couples with an interface such as PCMCIA of remote terminal 102 for receiving control signals and providing data as requested by remote terminal 102.

Authentication card 118 provides a portable storage device for information specific to an authorized user. Such information includes a mobile subscriber identifier which designates the assigned identity of an authorized user and an authentication encryption key used to securely authenticate an authorized user and generate a data encryption key for providing encrypted secure data transmission over wireless communication channel 114.

Figure 2:
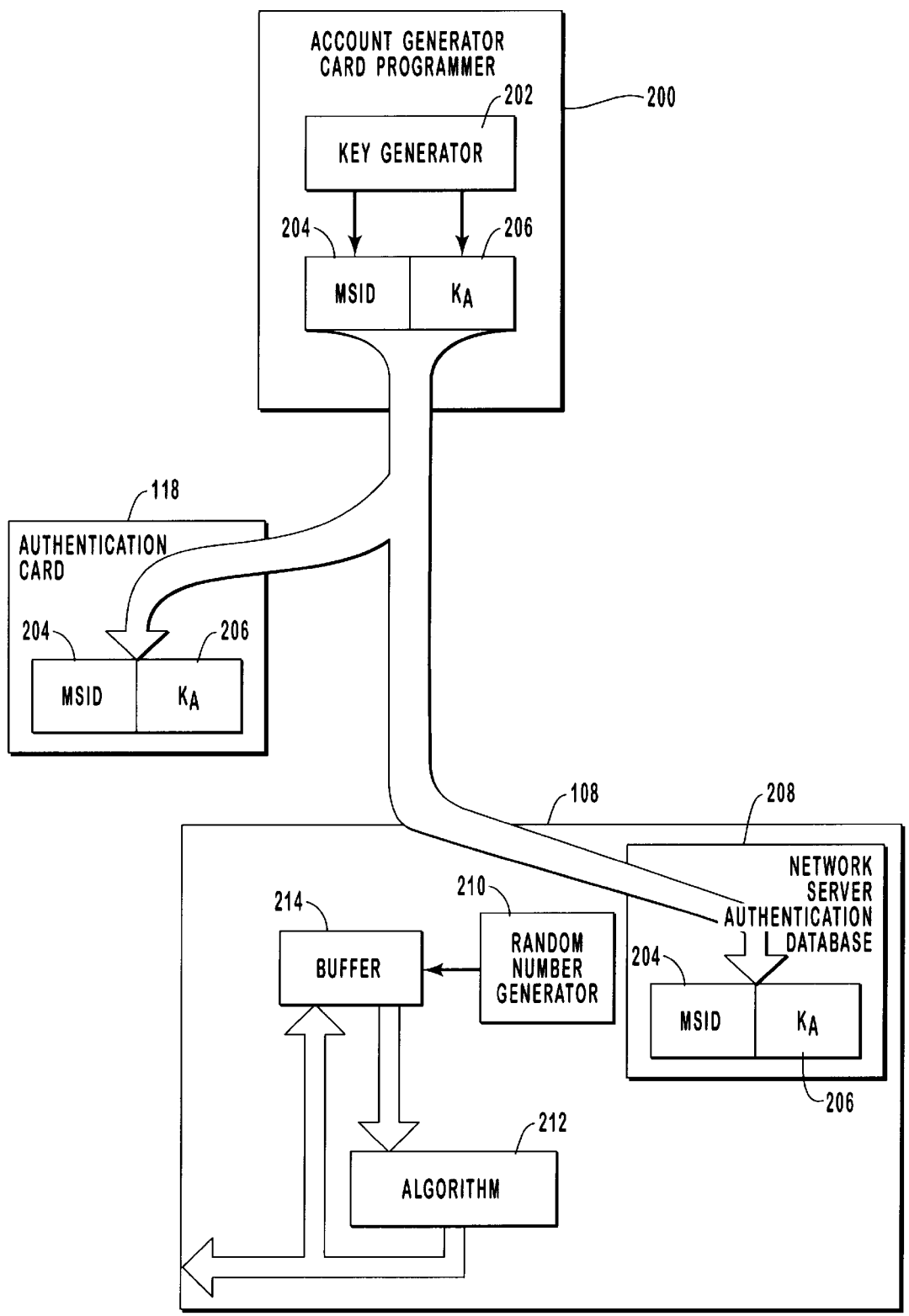
FIG. 2 is a functional block diagram depicting the generation, distribution, and processing of authentication keys, in accordance with one embodiment of the present invention.

FIG. 2 is a functional block diagram depicting the generation, distribution, and processing of authentication keys in accordance with one embodiment of the present invention. An account generator 200 processes requests by authorized users for the generation of an authorized entry into network server 108 to facilitate a remote connection to a communication network by the authorized user. Account generator 200 comprises a key generator 202 receptive to an authorization request for generation of a cryptographically suitable authentication encryption key 206. Key generator 202 generates authentication encryption key 206 in accordance with parameters established by the cryptographic algorithm employed by both remote terminal 102 and network server 108 and by authentication card 118 and network server 108 in an alternative embodiment where authentication card 118 executes the cryptographic algorithm. In the preferred embodiment, a symmetric encryption algorithm is employed and those skilled in the art will appreciate that symmetric encryption algorithms employ the same encryption key for both encryption and decryption. However, the utilization of asymmetrical encryption algorithms such as RSA, are within the contemplation of the present invention. Asymmetrical encryption slightly increases the complexity of key generation and distribution by requiring the generation and distribution of an encryption key pair, one for encryption and a separate for decryption.

A mobile subscriber identifier 204 (MSID) is a numeric string designating a specific identity of an authorized user. Account generator 200 assimilates MSID 204 with authentication encryption key 206 thus providing an indexing designator for use by network server 108 in distinguishing among a plurality of authentication encryption keys 206. Account generator 200 disseminates MSID 204 coupled with authentication encryption key 206 to both an authentication card 118 and to network server 108. In FIG. 2, account generator 200 is illustrated as being functionally separate from network server 108, however, nothing prevents account generator 200 from being physically associated with network server 108. Furthermore, in FIG. 2, account generator 200 may also possess functionality for accommodating the programming of MSID 204 and authentication encryption key 206 into authentication card 118.

Network server 108 is further comprised of a network server authentication database 208 for receiving and storing MSID 204 and authentication encryption key 206. As network server 108 may accommodate plurality of mobile authorized users, network server authentication data base 208 may be comprised of a plurality of entries for multiple authorized users each having a unique MSID 204 and a corresponding authentication encryption key 206. In the preferred embodiment, network server 108 is also comprised of a random number generator 210 employed during the authentication process for generating a pseudo-random number. As will be detailed in FIG. 5, a random number is employed during the authentication process of an authorized user with network server 108. Network server 108 further comprises functional elements such as algorithm 212 and buffer 214 for accommodating the authentication process.

Figure 3:
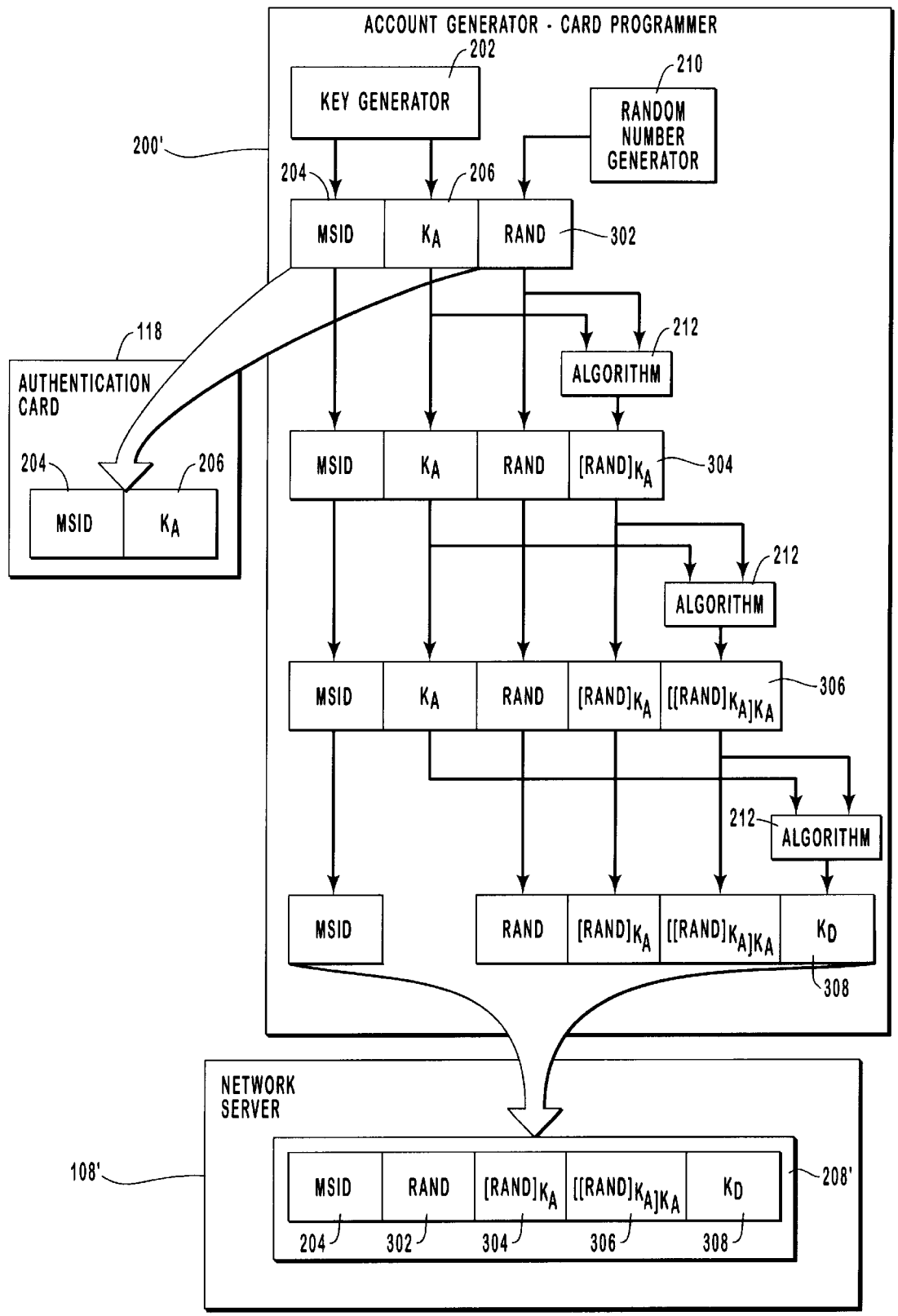
FIG. 3 is a functional block diagram of authentication key generation and distribution, in accordance with another embodiment of the present invention.

FIG. 3 is a functional block diagram of authentication key generation and distribution, in accordance with another embodiment of the present invention. The processing required by the network server 108' may be minimized by incorporating additional functionality into account generator 200'. In the present embodiment, account generator 200' generates or computes additional intermediate products or values for exchanging with remote terminal 102 (FIG. 1). Such intermediate terms are then distributed to network server 108' for storage and retrieval during the authentication process. In the present embodiment, account generator 200' comprises key generator 202 for providing the general functionality of generating an authentication encryption key 206 and associating such a key with MSID 204 as detailed in FIG. 2. Account generator 200' further comprises a random number generator 210 for generating a pseudo random number 302. As introduced in the description of FIG. 2 and to be further described in FIG. 5, random number 302 contributes to the authentication process. Algorithm 212 employs authentication key 206 and random number 302 to generate an authentication response 304. Authentication response 304 is further encrypted using authentication encryption key 206 and algorithm 212 to form a mobile authentication response 306, which is yet further encrypted using authentication encryption key 206 and algorithm 212 to form a data encryption key 308.

Account generator 200' then distributes mobile subscriber unit MSID 204, random number 302, authentication response 304, mobile authentication response 306, and data encryption key 308 to network server 108' for storage in network server authentication data base 208'. In the present embodiment, it is not necessary to distribute authentication encryption key 206 to network server 108' since account generator 200' has previously generated the intermediate terms necessary for verifying an authorized user. Furthermore, account generator 200' has additionally generated data encryption key 308 for use in transmitting encrypted data between remote terminal 102 and network server 108'.

Although this present embodiment minimizes the required functionality of network server 108', it is, however, deemed somewhat less secure because of the inability of network server 108' to generate a unique data encryption key for subsequent sessions with remote terminal 102.

Figure 4:
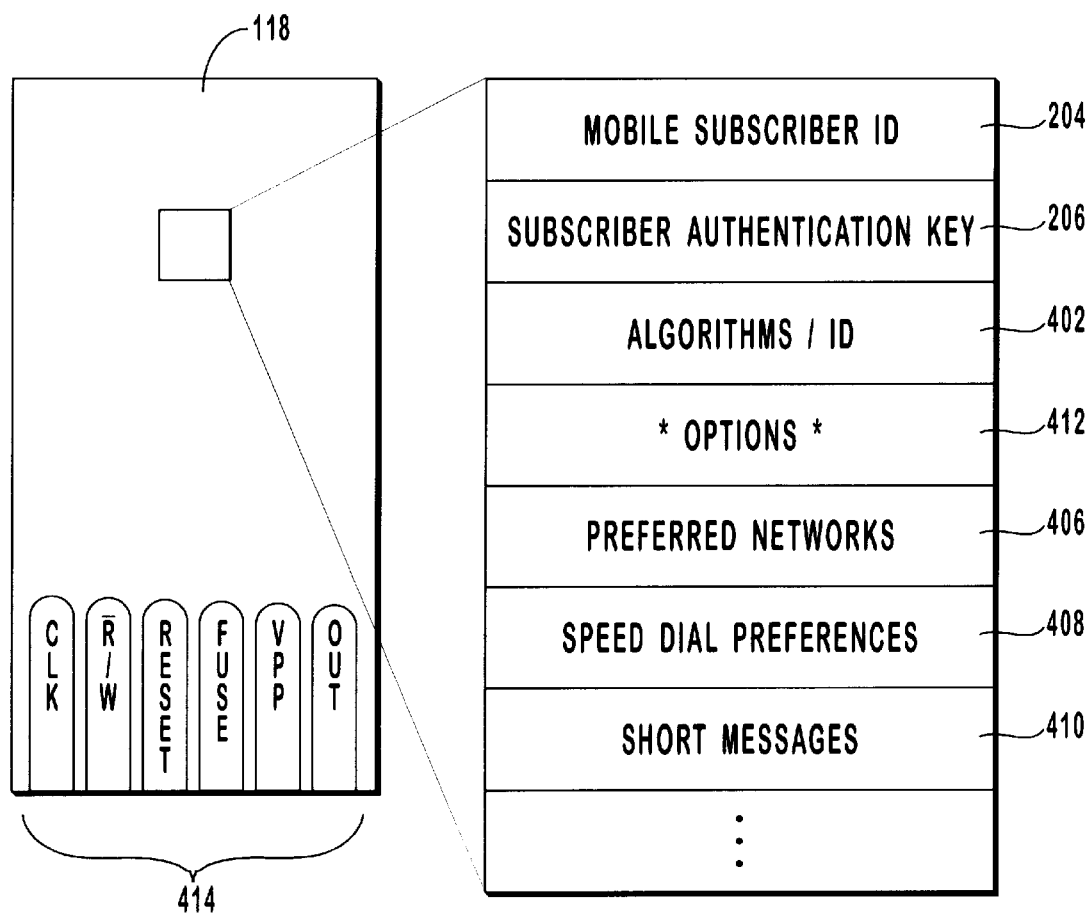
FIG. 4 is a diagram of an authentication card associated with an authorized user for storage and presentation of authorized user-specific information, in accordance with an embodiment of the present invention.

FIG. 4 is a diagram of an authentication card associated with an authorized user for storage and presentation of authorized user-specific information, in accordance with an embodiment of the present invention. Authentication card 118 stores an MSID 204, an authentication encryption key 206, and optionally may store other information such as algorithmic identifiers 402, optional parameters 412 for configuring or personalizing a remote terminal 102 according to an authorized user's preferences.

Authentication card 118 is a portable storage device such as a smart card that may be conveniently transported by an authorized user to a remote terminal. In the preferred embodiment, authentication card 118 takes the form of a GSM subscriber identity module (SIM). A GSM SIM card has been utilized by GSM cellular communication systems for delivery of user identification details such as an international mobile subscriber identity (IMSI) and an authentication encryption key. It should be noted that nothing in the present invention prohibits a GSM SIM card from being employed to function as authentication card 118. As shown in FIG. 4, when a GSM SIM card is employed, additional informational elements such as preferred networks 406, speed dial preferences 408, and short messages 410 may additionally be present within authentication card 118. Information may be extracted from authentication card 118 via interface 414 when authentication card 118 interfaces to card reader 116 (FIG. 1).

As mentioned above, authentication card 118 may be implemented using smart card technology wherein a microprocessor, with typically 8 kbytes of memory, is based on a silicon chip and is embodied in a credit card sized package, however, nothing requires that authentication card 118 necessarily assume such a configuration. Furthermore, integration or minimization of authentication card 118 with temporary integration into a card reader 116 (FIG. 1).

Figure 5:
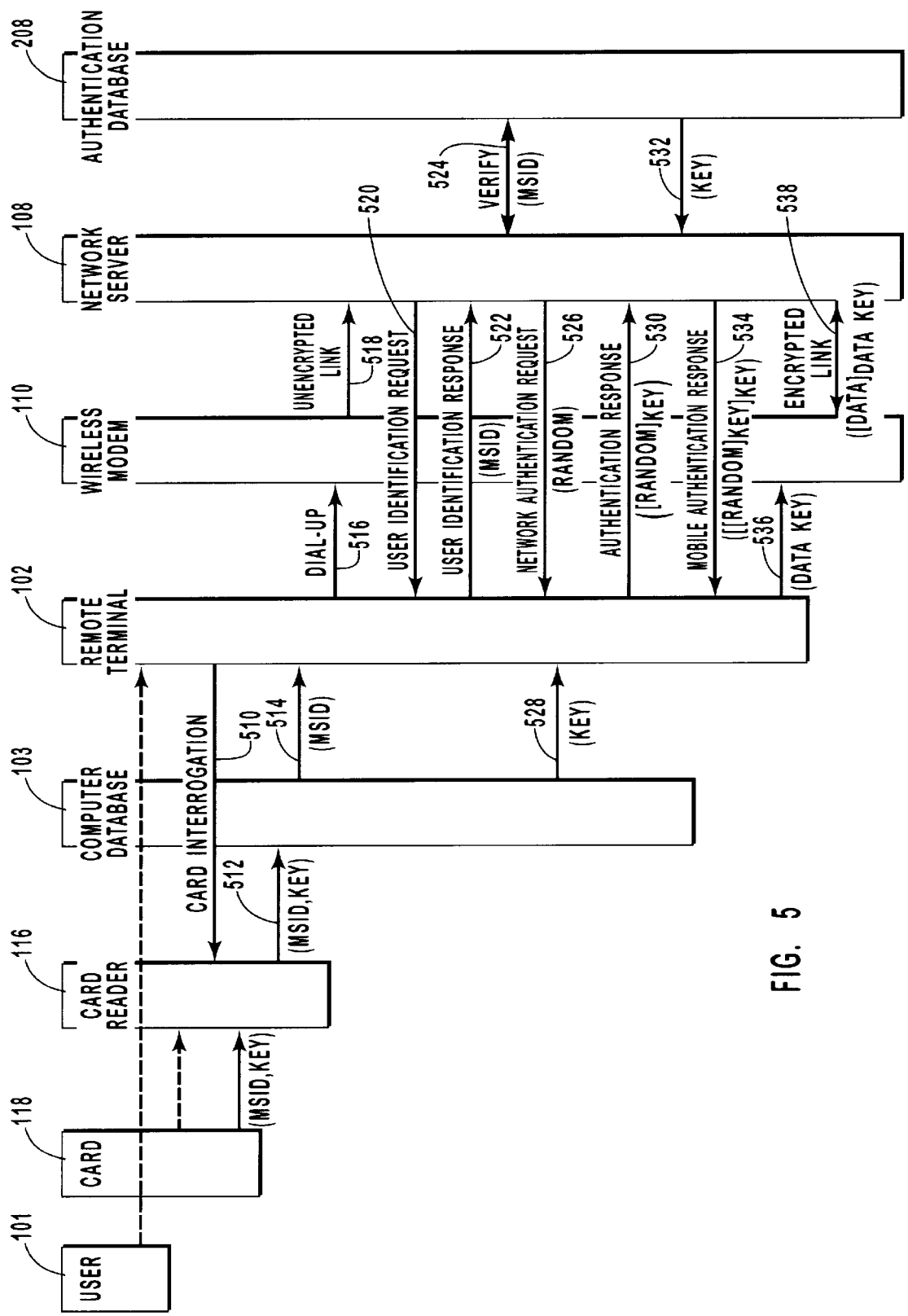
FIG. 5 is an authentication and encryption procedural diagram, in accordance with a preferred embodiment of the present invention.

FIG. 5 is an authentication and data encryption key-generation procedural diagram, in accordance with the preferred embodiment of the present invention. The authentication process commences with a user 101 approaching or interfacing with a remote terminal 102 for requesting access to computer network 104 (FIG. 1). User 101 inserts authentication card 118 into card reader 116 thus providing the appropriate credentials associated with user 101 to remote terminal 102 for use in verification by network server 108. In the preferred embodiment, remote terminal 102 performs a card interrogation 510 of card reader 116. Those skilled in the art will recognize that card reader 116 may interface with remote terminal 102 using established standard interfaces such as PCMCIA, serial bus, or other standard interfacing techniques. Card reader 116 then performs the appropriate interfacing to authentication card 118 over interface 114 (FIG. 4).

Card reader 116 in response to card interrogation 510 receives a mobile subscriber identifier and authentication key in a response 512 from authentication card 118. In the preferred embodiment, authentication card 118 divulges the authentication key in addition to the mobile subscriber identifier. In an alternative embodiment of the present invention, authentication card 118 retains the authentication encryption key therein with encryption being preformed by the authentication card by the internally secure authentication key. In such an embodiment, information for encryption is presented to authentication card 118 wherein encryption is performed by the authentication key in conjunction with stored algorithms and the encrypted information is then returned. In the preferred embodiment, a computer data base 103 resident within remote terminal 102 retains the mobile subscriber identifier and the authentication key for subsequent use by remote terminal 102 during the authentication process. Remote terminal 102 retrieves the mobile subscriber identifier in a response 514. Remote terminal 102 initiates contact with network server 108 by performing dial up function 516.

Wireless modem 110 then cooperatively generates an unencrypted link 518 with network server 108. Network server 108 performing its firewall or protective function initiates a user identification request 520 to remote terminal 102. In response to user identification request 520, remote terminal 102 responds with a user identification response 522 comprised of the mobile subscriber unit identifier as previously retrieved from user authentication card 118.

Network server 108 upon receipt of the mobile subscriber identifier performs a verification step 524 wherein the mobile subscriber identifier is compared against the previously established authentication database 208. Population of authentication database 208 describing the preferred embodiment was previously described in FIG. 2. Upon completion of the verification of the mobile subscriber identifier, network server 108, in the preferred embodiment, generates a random or pseudo-random number to initiate the authentication process.

In an alternative embodiment, as described in FIG. 3, network server 108 may have had a random number previously established and distributed thereto. In such an embodiment, subsequent authentication processes reuse the same random number to seed or initiate the authentication process.

Referring back to the preferred embodiment, network server 108 transmits a network authentication request 526 comprising the random number previously generated by network server 108. Remote terminal 102 upon receiving network authentication request 526 retrieves in a response 528 the authentication encryption key from computer database 103 in a response 528. Remote terminal 102, employing the authentication encryption key in conjunction with resident encryption algorithms, encrypts the received random number. As described above, in an alternative embodiment where authentication card 118 does not divulge the authentication encryption key, the random number is forwarded to the authentication card for performing encryption services. In such an embodiment, authentication card 118 then returns the encrypted random number through the card reader to remote terminal 102.

Remote terminal 102 generates an authentication response 530 comprised of the random number previously generated and transmitted by network server 108 encrypted by the authentication key originating from authentication card 118. Upon receipt of authentication response 530, network server 108 retrieves in a response 532 an authentication encryption key corresponding to the previously received mobile subscriber identifier. Network server 108 then encrypts the random number previously generated using this authentication encryption key in conjunction with resident encryption algorithms.

If user 101 of authentication card 118 is indeed an authorized user, then the authentication encryption key presented in authentication card 118 when used to encrypt the random number, will generate the same resultant encrypted random value as was generated by network server 108 when encrypting using its authentication key. Network server 108 then compares the encrypted random number as received in authentication response 530 with its resident generated encrypted random number.

In an alternative embodiment, network server 108 (FIG. 3) retrieves the pre-computed authentication response 304 (FIG. 3) for comparison with authentication response 530. When both results are equivalent, network server 108 has authenticated user 101 of remote terminal 102 as being an authorized user. Remote terminal 102, however, has not verified network 108 as being authentic. To facilitate this bidirectional process, network server 108 generates a mobile authentication response 534. Mobile authentication response 534 is comprised of the authentication response 530 as received from remote terminal 102 yet further encrypted by the authentication encryption key resident in network server 108. In an alternative embodiment, network server 108 (FIG. 3) retrieves mobile authentication response 306 (FIG. 3) for transmission to remote terminal 102. Such an encrypted response when received by remote terminal 102 demonstrates the authenticity of network server 108.

Remote terminal 102, upon receipt of mobile authentication response 534, internally encrypts the value previously generated for authentication response 530 for comparison with mobile authentication response 534, thus authenticating network server 108. Remote terminal 102 as operated by user 101 possessing an authentication card 118 has, therefore, been authenticated as being an authorized user of computer network 104 (FIG. 1). Network server 108 proceeds to facilitate access by remote terminal 102 to computer network 104 (FIG. 1).

To establish an encrypted link between remote terminal 102 and network server 108, each side must establish or generate a compatible data encryption key. Remote terminal 102 generates a data encryption key by encrypting its internally generated version of mobile authentication response 534. Likewise, network server 108 further encrypts mobile authentication response 534 using its authentication encryption key to generate a data encryption key. In an alternative embodiment, network server 108' (FIG. 3) retrieves data encryption key 308 (FIG. 3) for use in encrypting subsequent data.

In the preferred embodiment, remote terminal 102 transfers in response 536 the data encryption key it established to wireless modem 110. Wireless modem 110 then performs the encryption on subsequent data transmitted between remote terminal 102 and network server 108. In an alternative embodiment, remote terminal 102 retains the data encryption key and performs encryption of the data therein. An encrypted link 538 is, therefore, established for transmitting data encrypted in the data encryption keys between remote terminal 102 and network server 108. Correspondingly, remote terminal 102 and network server 108 upon receipt of encrypted data employs the data encryption key for decrypting the encrypted data.

The present invention may be embodied in other specific forms without departing from its spirit or essential characteristics. The described embodiments are to be considered in all respect only as illustratively and not restrictive. The scope of the invention is, therefore, indicated by the appended claims rather than by the foregoing description.

All changes which come within the meaning and range of equivalency of the claims are to be embraced within their scope.

What is claimed and desired to be secured by United States Letters Patent is:

1. In a computer network allowing remote access, a system for authenticating an authorized user prior to authorizing access to said computer network, said system comprising:

an account generator capable of generating both an authentication key and a mobile subscriber identifier for identifying said authorized user;

an authentication card for securely receiving said authentication key and said mobile subscriber identifier;

a remote terminal for facilitating remote access to said computer network, said remote terminal also receiving said authentication key and said mobile subscriber identifier from said account generator for use in authenticating said authorized user by encrypting and verifying mutually exchanged values across a wireless communication channel;

a network server for also securely receiving said authentication key from said account generator and for authenticating said remote terminal by encrypting and verifying mutually exchanged values with said remote terminal prior to permitting access to said computer network, said network server having a means for generating and transmitting a random number across said wireless communication channel;

a wireless modem operably coupled to said remote terminal and wirelessly coupled to said network server for establishing said wireless communication channel therebetween, wherein said wireless communication channel is capable of conversion into an encrypted authenticated wireless communication channel with (i) at said remote terminal, a means for encrypting said random number to form a remote terminal signed response: (ii) at said network server, a means for encrypting said remote terminal signed response to form a network signed response: and (iii) at said remote terminal, a means for encrypting said network signed response to form a data encryption key for use in encrypting all subsequent transferred data.

2. The system as recited in claim 1, wherein said account generator further comprises:

a means for securely distributing said authentication key with said mobile subscriber identifier to said network server within said computer network; and a means for programming said authentication key with said mobile subscriber identifier into said authentication card for said authorized user.

3. The system as recited in claim 1, wherein said authentication card conforms to a GSM subscriber identification module (SIM) and said mobile subscriber identifier is an international mobile subscriber identifier (IMSI).

4. The system as recited in claim 1, wherein said system further comprises a card reader operably coupled to said remote terminal for receiving said authentication card and extracting both said mobile subscriber identifier and said authentication key from said authentication card.

5. In computer network permitting remote access by an authorized user of a remote terminal via a wireless modem, a method for establishing a secure authenticated wireless communication channel, said method comprising:

securely distributing an authentication key to a network server of said computer network and to an authentication card for said authorized user, said authentication key being associated with a mobile subscriber identifier designating said authorized user;

establishing an unencrypted wireless communication channel between said remote terminal and said network server via a wireless modem;

corroborating said mobile subscriber identifier between said authentication card and said network server;

generating a random number at said network server;

transmitting said random number to said remote terminal via said unencrypted wireless communication channel;

encrypting said random number at said remote terminal to form a remote terminal signed response;

returning said remote terminal signed response to said network server via said unencrypted wireless communication channel;

encrypting said remote terminal signed response at said network server to from a network signed response;

returning said network signed response to said remote terminal via said unencrypted wireless communication channel;

verifying said remote terminal signed response received at said network server with an expected value;

verifying said network server signed response at said remote terminal with an expected value; and transforming said unencrypted wireless communication channel into an encrypted authenticated wireless communication channel by i) yet further encrypting said network server signed response at the network server to form a data encryption key;

ii) yet further encrypting said network server signed response at the remote terminal to form another data encryption key corresponding to said data encryption key formed by said network server;

iii) securing future data transferred between said remote terminal and said network server using said data encryption key and said another data encryption key; and iv) permitting access of said remote terminal to said computer network via said network server.

6. The method as recited in claim 5, wherein said step of securing future data comprises the steps of:

downloading said another data encryption key to the wireless modem; and encrypting the data at the wireless modem.

7. In a computer network allowing remote access by an authorized user via a network server, an apparatus for establishing an encrypted authenticated wireless communication channel with said network server prior to permitting remote access to said computer network, said apparatus comprising:

a means for receiving a mobile subscriber identifier and an authentication key from an authentication card associated with said authorized user;

a means for cooperatively establishing an unencrypted wireless communication channel with said network server;

a means for authenticating said user of said remote terminal according to mutually exchanged encrypted values; and a means for transforming said unencrypted wireless communication channel into said encrypted authenticated wireless communication channel, wherein said means for transforming said unencrypted wireless communication channel into said secure authenticated wireless communication channel comprises means for yet further encrypting a network server signed response at said apparatus to form a data encryption key for use in encrypting all subsequent transferred data.

* * * * *